United States Patent Office 3,465,160
Patented Sept. 2, 1969

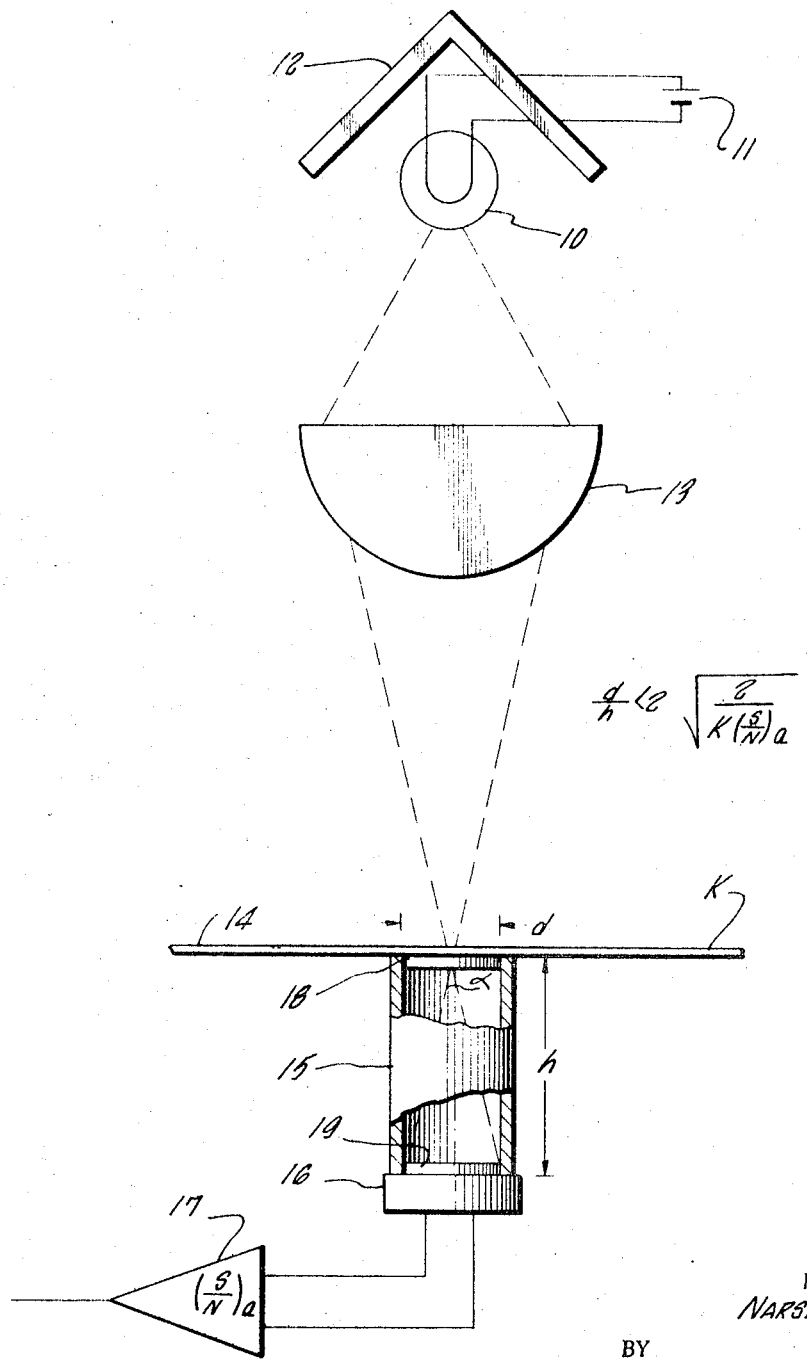

3,465,160
PERFORATED TAPE READER HAVING LIGHT ABSORBENT TUBE BETWEEN TAPE AND LIGHT SENSOR
Narsingh Deo, Arcadia, Calif., assignor to Burroughs Corporation, Detroit, Mich., a corporation of Michigan
Filed May 16, 1966, Ser. No. 550,543
Int. Cl. G01n 21/30
U.S. Cl. 250—219                                                       4 Claims

ABSTRACT OF THE DISCLOSURE

A tube having a black, light absorbent, cylindrical surface that encloses a light transmitting medium is disposed between the tape and the photoelectric cell in a perforated tape reader. The ratio of the diameter of the tube to the height of the tube is smaller than $$2\sqrt{\frac{2}{K\left(\frac{S}{N}\right)_a}}$$

where K is an empirically determined property of the tape indicative of its transmissivity and diffusivity and $(S/N)_a$ is the minimum signal-to-noise ratio of light energy that the photoelectric cell and its amplifier are able to accommodate. Discs made of a material capable of transmitting light are fitted within the tube in spaced apart relationship so as to be flush with its ends.

---

This invention relates to a component for use in retrieval of information stored on tape, and more particularly, to a reader of perforated tape.

The use of a tube with a black, light-absorbent inside surface to increase the directionality of the light entering a photoelectric cell is well known. An application of this principle in a reader of perforated tape is found in F. M. Demer Patent 3,055,583 issued Sept. 25, 1962. No criterion for the dimensions of the tube in terms of the rest of the system is, however, set forth in the Demer patent. Thus, a hit-or-miss approach is indulged in to determine the dimensions of the tube, which results in frequent erroneous representations in the electrical signal produced by the reader with respect to the state of the tape, i.e., perforated or unperforated.

A problem associated with the use of such a tube to increase the directionality of a photoelectric cell is the accumulation inside of the tube of dust particles that impede the passage of light, and thus causes additional errors in the electrical signal produced by the reader.

According to the invention a tape reader is provided, in which a source of light is focused upon one side of a perforated tape and a tube with a black, light-absorbent cylindrical surface is situated on the other side of the tape. The tube, which has a light transmitting medium enclosed by the black surface, couples light passing through perforations in the tape to a photoelectric cell. The surface of the tape covers one end of the tube and the photoelectric cell is covered by the other end. The photoelectric cell converts the light energy incident upon it into an electrical signal that is applied to an amplifier preparatory to use as the output of the tape reader. The dimensions of the tube bear a definite relationship to the characteristics of the tape and of the amplifier. Specifically the ratio of the diameter of the tube to the height of the tube must be smaller than $$2\sqrt{\frac{2}{K\left(\frac{S}{N}\right)_a}}$$

where K is an empirically determined property of the tape indicative of its transmissivity and diffusivity and $(S/N)_a$ is the minimum signal-to-noise ratio of light energy that the amplifier and photoelectric cell are able to accommodate. When this criterion is followed the output of the tape reader is a very accurate electrical representation of the state of the tape, i.e., perforated or unperforated.

To prevent the accumulation of dust particles within the tube, it is sealed from the atmosphere. This can be achieved by placing discs made of clear material with good light transmission properties within the tube flush with its ends or by completely filling the tube with the clear material. The latter has the advantages that it is easy to fabricate and the clear material strengthens the tube, but carries with it the disadvantage that light passing through the material in the tube undergoes more attenuation.

These and other features of the invention are considered further in the following detailed description taken in connection with the drawing, the single figure of which is a schematic diagram of a tape reader illustrating the principles of the invention.

In the drawing a source of light 10 is provided with power by a battery 11. The light from source 10 is directed by a reflector 12 towards a half cylindrical lens 13 that converges the light from source 10 onto a line on the top of tape 14. Tape 14 is perforated in accordance with a binary code and is supported and transported (by well-known tape handling means not shown) so that the perforations in the tape pass along the line of light from source 10. A tube 15 having a black, light-absorbing cylindrical surface is placed at a point along the line of light underneath tape 14. The black surface of tube 15 encloses a light transmitting medium, namely free space. One end of tube 15 is covered with tape 14 and the other end covers the light-sensitive element of a photoelectric cell 16 to prevent extraneous light from affecting it. The output of photoelectric cell 16, across which an electrical signal related to the quantity of light incident upon it appears, is coupled to the input of an amplifier 17.

The output of amplifier 17 is an electrical signal having one of two values that are supposed to represent the presence or absence of perforations in the tape. In order to insure that the output of amplifier 17 accurately and consistently represents the state of tape 14, i.e., perforated or unperforated, there is a minimum signal-to-noise ratio of the light energy incident upon photoelectric cell 16 that photoelectric cell 16 and amplifier 17 can accommodate, hereafter designated $(S/N)_a$. Stated in other terms, the difference between the light energy incident upon photoelectric cell 16 when a perforation appears in the tape and the light energy incident upon photoelectric cell 16 when no perforation appears in the tape must be sufficiently large that amplifier 17 consistently discriminates between these two states of light energy, its output assuming one level in the first case and another level in the second case. The term $(S/N)_a$ is a characteristic of the devices serving as photoelectric cell 16 and amplifier 17 and more specifically is a function of the internal noise generated by these devices.

The solid angle at tape 14 subtended by the light-sensitive element of photoelectric cell 16 can be expressed as $$\alpha = \frac{\pi}{4}\left(\frac{d}{h}\right)^2 \tag{1}$$

where $\alpha$ is the solid angle, $d$ is the diameter of tube 15, and $h$ is the height of tube 15. The light energy incident upon the light-sensitive element of photoelectric cell 16 when no perforation is present can then be expressed as $$E_p = \frac{\alpha}{2\pi} K E_t \qquad (2)$$

where $E_p$ is the light energy incident upon photoelectric cell 16 without perforations, $E_t$ is the light energy incident upon tape 14 with the area of the opening of tube 15, and K is an experimentally determined constant, hereafter called the transmissivity-diffusivity constant, that is indicative of the transmissivity and diffusivity of tape 14.

To determine the transmissivity-diffusivity constant K, the tape reader itself or a special laboratory setup could be employed. In the case where the tape reader itself is employed to determine K, light from source 10 is directed at tape 14, $E_t$ and $E_p$ are each measured with a photoelectric cell, and $\alpha$ is determined according to Equation 1 by measuring $d$ and $h$ of tube 15. These experimental values are then substituted into Equation 2 and K is solved for. The value of K is a property of the type and thickness of material used for tape 14 and does not change as the other parameters of the system, e.g., the dimensions of tube 15, the light incident upon tape 14, or the characteristics of photoelectric cell 16 and amplifier 17, are varied.

The signal-to-noise ratio of the light energy incident upon photoelectric cell 16 during operation in the tape reader is defined as the ratio of the light energy incident upon photoelectric cell 16 when a perforation appears in the tap to the light energy incident upon photoelectric cell 16 when no perforation appears in the tape. $E_t$, the light energy incident upon tape 14 within the opening of tube 15 is also the light energy incident upon photoelectric cell 16 when there is a perforation in tape 14, because the perforations are at least as large as the opening in tube 15. The signal-to-noise ratio of the light energy incident upon photoelectric cell 16 can therefore be expressed as $$\left(\frac{S}{N}\right)_p = \frac{E_t}{E_p} \qquad (3)$$

where $(S/N)_p$ is the signal-to-noise ratio of the light energy incident upon photoelectric cell 16. Manipulating Equations 1, 2, and 3 the diameter-to-height ratio of tube 15 can be expressed in terms of K and $(S/N)_p$ as $$\frac{d}{h} = 2\sqrt{\frac{2}{K\left(\frac{S}{N}\right)_p}} \qquad (4)$$

Since the signal-to-noise ratio of the light energy incident upon photoelectric cell 16, $(S/N)_p$, must be greater than the minimum signal-to-noise ratio $(S/N)_a$ that photoelectric cell 16 and amplifier 17 can accommodate, $$\frac{d}{h} > 2\sqrt{\frac{2}{K\left(\frac{S}{N}\right)_a}} \qquad (5)$$

Thus Equation 5 gives a criterion for determining the dimensions of tube 15 in terms of the characteristics of tape 14 photoelectric cell 16, and amplifier 17, which insures an accurate reproduction of the state of the tape at the output of amplifier 17.

Discs 18 and 19, made of a clear plastic material with good light transmission properties, are placed in tube 15 flush with its ends to seal it from the atmosphere and thereby prevent accumulation of dust within the tube. As an alternative to employing discs, tube 15 could be filled with a clear plastic material which would then provide support for the walls of tube 15. This is easier to fabricate than the disc-terminated tube, but attenuates the light energy passing through the plastic material in an amount proportional to the height of the tube. This means the signal-to-noise ratio of the electrical signal produced by photoelectric cell 16 is reduced. At the same time, the higher tube 16 is the better is the signal-to-noise ratio of the electrical signal produced by photoelectric cell 16 according to Equation 4. As a result, when tube 15 is filled to seal it, an optimum tube-height exists beyond which further increases reduces the resultant signal-to-noise ratio. This point should not be exceeded in dimensioning tube 15.

What is claimed is:

1. A tape reading system comprising a perforated tape having a transmissivity-diffusivity constant K, a source of light directed upon one surface of the tape within the perforated area, a photoelectric cell generating an electrical signal responsive to light energy incident upon it, an amplifier connected to amplify the electrical signal generated by the photoelectric cell, the amplifier and photoelectric cell being able to accommodate light energy with a minimum signal-to-noise ratio of $(S/N)_a$, and a tube with a black, light-absorbent cylindrical surface that encloses a light transmitting medium, the tube being located so as to couple light from the source passing through perforations in the tape to the photoelectric cell, the tube having a diameter $d$ and a height $h$ and being so dimensioned that $$h > \frac{d}{2\sqrt{\frac{2}{K\left(\frac{S}{N}\right)_a}}}$$

2. The tape reading system of claim 1, in which the light transmitting medium comprises two discs made of a solid material with good light-transmission properties fitted within the tube in spaced apart relationship so as to be flush with its ends and free space between the discs.

3. A reader of perforated tape having a transmissivity-diffusivity constant K comprising a source of light directed on the perforated portions of the tape, from one side of the tape, a photoelectric cell located on the other side of and spaced from the tape so as to intercept light from the source passing through perforated portions of the tape, an amplifier, means for coupling the output of the photoelectric cell to the amplifier, the amplifier and photoelectric cell being capable of discriminating between light energy levels with a signal-to-noise ratio at least as large as $(S/N)_a$, and a tube with a black, light-absorbent cylindrical surface having one end flush with the tape and the other end flush with the light-sensitive part of the photoelectric cell, the cylindrical surface enclosing a light transmitting medium, the tube having a diameter $d$ and a height slightly larger than $$\frac{d}{2\sqrt{\frac{2}{K\left(\frac{S}{N}\right)_a}}}$$

4. The tape reader of claim 3, in which the light transmitting medium comprises two discs made of a material with good light-transmission properties fitted within the tube in spaced apart relationship so as to be flush with its ends and free space between the discs.

References Cited

UNITED STATES PATENTS

| | | | |
|---|---|---|---|
| 2,916,624 | 12/1959 | Angel et al. | 250—219 |
| 3,248,554 | 4/1966 | Chen | 250—219 |
| 3,360,635 | 12/1967 | Wolf et al. | 250—219 |

OTHER REFERENCES

IBM Technical Disclosure Bulletin, Goldbach et al., vol. 6, No. 6, November 1963.

RALPH G. NILSON, Primary Examiner

C. M. LEEDOM, Assistant Examiner

U.S. Cl. X.R.

250—227